(12) United States Patent  (10) Patent No.: US 8,302,635 B2
Bohler  (45) Date of Patent: Nov. 6, 2012

(54) DOSAGE-DISPENSING ELEMENT ON A CONTAINER FOR FREE-FLOWING OR POURABLE BULK MATERIALS

(75) Inventor: Lorenz Bohler, Möhlin (CH)

(73) Assignee: Mettler-Toledo AG, Greifensee (CH)

( * ) Notice: Subject to any disclaimer, the term of this patent is extended or adjusted under 35 U.S.C. 154(b) by 576 days.

(21) Appl. No.: 12/376,377

(22) PCT Filed: Jul. 20, 2007

(86) PCT No.: PCT/CH2007/000358
§ 371 (c)(1),
(2), (4) Date: Feb. 16, 2009

(87) PCT Pub. No.: WO2008/017175
PCT Pub. Date: Feb. 14, 2008

(65) Prior Publication Data
US 2010/0193074 A1 Aug. 5, 2010

(30) Foreign Application Priority Data
Aug. 8, 2006 (CH) ...................................... 1272/06

(51) Int. Cl.
*B65B 1/04* (2006.01)
*B65B 3/04* (2006.01)
(52) U.S. Cl. .......... 141/10; 141/114; 141/313; 141/314; 53/576; 53/568
(58) Field of Classification Search ............... 141/114, 141/313, 283, 10, 314–316; 53/576, 567, 53/568, 551, 459, 469
See application file for complete search history.

(56) References Cited

U.S. PATENT DOCUMENTS
3,975,795 A 8/1976 Kupcikevicius et al.
(Continued)

FOREIGN PATENT DOCUMENTS
DE 19806932 A1 9/1999
(Continued)

OTHER PUBLICATIONS
Denk, R., "Staubfrei im Griff Auslaufanschluβsystem für die Big-Bag-Entleerung" (Translated Title: "Reliably Dust-Free Outlet Connector System for the Emptying of Big Bags"), Chemietechnik Huthig, Jul. 1998, pp. 76, vol. 27, No. 7, Heidelberg, Germany (XP000777414).

*Primary Examiner* — Dinh Q Nguyen
*Assistant Examiner* — Jennifer Gordon
(74) *Attorney, Agent, or Firm* — Standley Law Group LLP

(57) ABSTRACT

A dosage-dispensing element (30) on a container (10, 11) for free-flowing or pourable bulk materials has an outlet spout (12) that reaches into the element. The element has an inlet opening (32) on the side facing towards the container, a clamping profile (42) and/or a quick-tightening device (44) which makes a releasable connection between the outlet spout and the element, a slot-shaped outlet opening (34) on the side that faces away from the container, a ring gap (22) between the outlet spout and the inlet opening, a wall (36) extending between the respective openings with an inside (37) and an outside (38), and a foil-shaped material (20), especially a foil hose or foil section, stored in the area of the outlet spout. The inlet opening, the inside of the wall and the slot-shaped outlet opening are covered with the foil-shaped material.

13 Claims, 5 Drawing Sheets

U.S. PATENT DOCUMENTS

| | | | |
|---|---|---|---|
| 4,430,773 A * | 2/1984 | Becker et al. | 452/38 |
| 4,638,951 A | 1/1987 | Gabriel | |
| 4,649,602 A * | 3/1987 | Kupcikevicius | 452/38 |
| 5,791,123 A * | 8/1998 | Bolz | 53/434 |
| 5,944,070 A | 8/1999 | Schmidt et al. | |
| 6,009,685 A * | 1/2000 | Dahlberg | 53/175 |
| 6,132,090 A * | 10/2000 | Hashimoto | 383/67 |
| 2001/0027822 A1 * | 10/2001 | Bertolo | 141/66 |
| 2007/0251599 A1 | 11/2007 | Denk et al. | |

FOREIGN PATENT DOCUMENTS

WO 00/47473 A1 8/2000

* cited by examiner

DOSAGE-DISPENSING ELEMENT ON A CONTAINER FOR FREE-FLOWING OR POURABLE BULK MATERIALS

CROSS-REFERENCE TO RELATED APPLICATIONS

This application is a national stage entry, under 35 USC 371 of PCT/CH2007/000358, filed on 20 Jul. 2007, which in turn claims a benefit of a right of priority under 35 USC §119 from Swiss patent application 1272/06, filed on 8 Aug. 2006.

TECHNICAL FIELD

The invention relates to a dosage-dispensing element on a container for free-flowing or pourable bulk materials according to the introductory part of claim 1, and it further relates to a method according to claim 9 for filling free-flowing or pourable bulk materials.

BACKGROUND OF THE ART

Dosage-dispensing elements are employed in applications where a multitude of different raw materials in pulverous or granular form are brought together in the course of one or more mixing- and/or refining processes to produce a final product. The chemical and pharmaceutical industries can be mentioned as examples where such processes take place. While formulations in the development stage in the laboratory can be mixed from the smallest quantities, the full-scale manufacture of the final product involves industrial quantities, as this is the only way to achieve a sufficient lot size and thus an economical production. Especially in pharmaceutical chemicals, the sterility of the instruments and apparatus being used is of primary importance next to the purity of the raw materials, because only a rigorous quality management ensures that the quality standards can be maintained which have by now been established within the context of certification processes in almost all segments of industry. Under this aspect, it is of special importance that the equipment involved is immediately after use subjected to cleaning procedures, some of which are extremely costly, before the equipment can be put back into operation after it has passed a diversity of hygiene tests and function checks. Eminently critical in the production of chemicals, especially in the manufacture of pharmaceuticals, is the transfer of raw materials and intermediate products into the intermediate storage containers and/or mixing containers, and the transfer into shipping- or storage containers at the end of the production process.

In order to be able to dispense defined quantities of formulation components as accurately as possible even if the quantities are large, one uses dosage-dispensing elements with variable outlet openings. These can be arranged not only between the containers but also inside of hose conduits to provide the ability of manually or automatically controlling the product flow dependent on the precision and speed required in the dosage-dispensing process.

The problem with using this kind of a dosage-dispensing element is that during the filling- or dispensing process at least the inside of the element is in permanent contact with the product being dispensed. This has the consequence that one either has to use a special dosage-dispensing element for each substance that is to be dispensed in order to extend the usage intervals, or else to perform the cleaning and checking of the dosage-dispensing element after each dispensing process, especially in view of the aforementioned quality standards, in order to prevent cross contamination.

Of additional concern is the fact that after the completion of the dispensing process or after removing the filled container, the user of the filling apparatus can come into contact with the dispensed product for a certain time interval. This is the case for example if there are still product residues present in the dosage-dispensing element and/or if a pulverous product with a tendency for spreading dust is being dispensed. It cannot be excluded in such a case that the user may become contaminated and that his/her health may be endangered by contact with the user's skin, mucous membranes or respiratory tract.

In order to eliminate the last-mentioned aspect and to reduce the associated risks as much as possible, an emptying device for bags is proposed in EP 0 835 829, with an inner bag and an outer bag (so-called bulk bags), wherein the device includes a holder device for bulk bags and a dual-tube device with an inner tube and an outer tube is arranged in centered alignment below the holder device. In the inner tube, this emptying device preferably has an up-and-down movable gripper device which serves to grip the bottom of the inner bag and which can be pulled from an up-position to a down-position by means of a pulling device that is operable from the outside.

A device to empty and fill flexible containers for pourable materials without causing contamination is described in WO 2005/056443. This device uses a film hose as connecting member between a container that is to be emptied and a connecting hose or an inlet opening. After the filling/emptying process, the film hose is tied off and separated together with the flexible container and/or the filled container, and the contaminated film hose is disposed of.

In DE 198 06 932 A1, a device is shown for the non-contaminating delivery of pourable materials from a storage container into a transport container, where at the outlet spout of the storage container, which is equipped with a closure device, an exchangeable collar is arranged which can be connected to the transport container.

A device to fill hose-shaped containers is proposed in DE 2660519 C2. The containers are stored in the area of the filling device and are pulled over the latter during the filling process. After they have been filled, the hose-shaped containers are closed and remain on the product as a food wrapper as shown in the example.

The aforementioned devices have a variety of disadvantages. Although the unintended escape of fill material is prevented as much as possible in all of the devices and, accordingly, the contamination of the surrounding space and of the attending personnel is reduced to a very large extent, the fill material in all of the proposed devices is in contact with the filling apparatus and/or the dosage-dispensing elements during the transferring- or filling process. After devices of this kind have been used in critical application areas it will therefore be necessary to clean or decontaminate the entire filling- or dosage-dispensing device. A suitable cleaning process takes much time and expense and involves a series of checks before the filling- or dosage-dispensing device can be put back into operation.

It is therefore the object of the present invention to provide dosage-dispensing elements which can be used without causing contamination and can be cleaned quickly, easily and economically.

SUMMARY

This task is solved by a dosage-dispensing element on a container for free-flowing or pourable bulk materials with the distinguishing features of claim 1 and a method according to claim 9 for filling free-flowing or pourable bulk materials. Further preferred embodiments of the invention are the subjects of the dependent claims.

According to the invention, a dosage-element is proposed which is arranged on a container of free-flowing or pourable materials with an outlet spout that reaches into the dosage-dispensing element. The dosage-dispensing element comprises an inlet opening on the side facing towards the container, a clamping profile and/or a quick-tightening device for the releasable connection of the outlet spout and the dosage-dispensing element to each other, a slot-shaped outlet opening on the side that faces away from the container, a ring gap between the outlet spout and the inlet opening, a wall extending between the inlet opening and the outlet opening with an inside and an outside, and a film-shaped material, in particular a polymer film, stored in the area of the outlet spout. The container can be a storage hopper to which the outlet spout is solidly connected, for example welded. As a further possibility, the dosage-dispensing element can also be arranged on a container in the shape of a funnel, in whose fill spout bags can be inserted or which can be set below the outlet opening of large silos.

It is further envisioned that the inlet opening, the inside of the wall and the slot-shaped outlet opening are lined with the film-shaped material.

In a preferred embodiment of the invention, the stored film-shaped material has the form of an endless hose. As another possibility, the material can also be stored in the form of individual hose sections. Before setting the dosage-dispensing element in place or before the dispensing process, the hose sections can be pulled over or through the dosage-dispensing element and can likewise be stored in the area of the outlet spout of the container. It is further possible to store an endless film hose which has perforations at defined places and is separated into individual sections by tearing. In a further preferred embodiment it is envisioned to store the film-shaped material in the form of an endless ribbon which is welded into a hose only at the point of use, i.e. when the film material is introduced into the ring gap between the outlet spout and the inlet opening, by joining the borders lengthwise in a welded seam. When using an endless hose or an endless film, it is advantageous to arrange a film-separating device in the area of one of the openings in order to ensure a clean separation of the dirty hose section before a new hose section is pulled in. Depending on the film material being used, the separation can be performed for example with knives or hot wires.

Beyond these proposed arrangements it is of course conceivable to form out of the film hose itself, with an additional weld seam along one end border, a bag into which the dosage material is filled and which is closed after the filling process either by the aforementioned separating devices or for example with a clamping device.

To ensure that the hose-shaped film material, the hose section or the film bag, which is passed through the dosage-dispensing element, does not slip down or is pulled out of the dosage-dispensing element during the filling- or dispensing process, it proves especially advantageous to connect the film-shaped material in a releasable manner, particularly with at least one clamp, a quick-tightening device, a clamping band, a hose clamp and/or a tension band with the outlet spout. These clamps or quick-tightening devices can either be fastened to the dosage-dispensing element itself and thus be used at the same time to fasten the dosage-dispensing element by clamping it to the outlet spout, or else they can be configured in the shape of a separate circular band or ring with appropriate tightening of clamping devices.

The design of a preferred embodiment of the present invention includes between the outlet spout of the container and the inlet opening of the dosage-dispensing element an intermediate part in the form of a short tubular section through which the film-shaped material is passed. The intermediate part has at one end a circular sealing sleeve which additionally fastens the film-shaped material. The sealing sleeve can be configured in the shape of a lip that is formed of an elastic material and is pushed over the outlet spout in gliding contact. It is also possible to use a plastic clamping profile which can be tightened by means of pneumatic actuators or through quick-tightening devices or clamping screws. Furthermore, a sealing profile can be provided in the form of a hose running in a closed circle which is connected to the intermediate part and which is being inflated in order to clamp the intermediate part and/or the film-shaped material. The sealing profile can in this case be received in a U-profile which has extensions to one or both sides either welded on or folded out, so that the U-profile simultaneously forms the intermediate part.

The aforementioned clamping and tightening devices can of course be used for all clamping and tightening needs that occur in the context of the present invention and are not limited to being used exclusively with the aforementioned intermediate part.

The present invention further includes a method for filling free-flowing or pourable bulk materials into receptacles. According to the method, a hose-shaped film material is first delivered through a ring gap which exists between a dosage-dispensing element in the non-tightened condition and an outlet spout that reaches into the dosage-dispensing element; the film hose is then passed through the dosage-dispensing element and finally passed through a slot-shaped outlet opening to the outside of the dosage-dispensing element. This has the result that the inlet opening, the inside of the wall and the slot-shaped outlet opening of the dosage-dispensing element are covered with the film-shaped material. The film material is preferably connected with clamps to the outlet spout. For this purpose, all of the clamping- and tightening devices can be used which have already been described above. According to an embodiment of the invention, if a film material in the form of a ribbon is used, it is part of the method that after the ribbon has been introduced through the ring gap and before it is passed through the dosage-dispensing element, the ribbon is welded together into a film hose in order to prevent the dosage material from escaping. If a low-risk material is dispensed or if no special hygiene requirements have to be met, it is also possible to use the film ribbon without welding it together, if the borders of the film ribbon have a sufficient amount of overlap.

As a preferred concept, an additional intermediate part is inserted between the outlet spout and the dosage-dispensing element. The intermediate part, which is equipped in particular with a plastic sealing sleeve or other clamping- or tightening devices that have already been described above, fixates the film hose in its position on the outlet spout after the dosage-dispensing element has been removed and facilitates the removal and exchange of the film hose.

If a properly lined dosage-dispensing element is used in accordance with this description, the dosage-dispensing element never comes into contact with the product to be dispensed and is therefore not dirtied and/or contaminated by the product. The cleaning, along with the required dismantling of the entire dosage-dispensing device, can therefore be left out, because in preparation for a new dispensing- or filling process, one simply pulls a new, unused hose section into the dosage-dispensing element. This saves the time that would otherwise be needed for the extensive cleaning, so that the associated additional labor costs as well as expenditures for the comprehensive hygiene- and function checks can be reduced considerably. The proposed method also offers significant improvements in regard to the risks for the operators and especially the cleaning staff. With conventional dosage-dispensing elements and/or devices, special precautions are required for the protection of the staff and the environment, in particular if aggressive substances are involved. This means for example that the dosage-dispensing devices which are being used have to be brought into special rooms for cleaning, that they may have to be treated with special cleaning equipment and cleaning substances, and that the resultant waste water and/or used-up cleaning articles will have to be separated for disposal.

By using the present invention and applying the method according to the invention, this considerable effort and expense is eliminated, as only the film hose or film hose section that was in contact with the product needs to be disposed of after the dispensing task has been completed or the container has been completely emptied.

In addition, the present invention makes it possible to perform a so-called cleaning-in-place (CIP) procedure in large containers such as silos, meaning that the container is left in place and not taken apart for the cleaning. While one previously had no choice but to completely dismantle the used dosage-dispensing element in order to clean it of deposits of cleaning agents or rinsed-out product residues and to perform the aforementioned checks prior to the next use, this effort no longer occurs, because the only thing left to be done is to remove and dispose of the film hose or film hose section that covers the dosage-dispensing element.

There are two possible ways to remove the film hose from the dosage-dispensing element, depending on the film hose being used. If individual film hose sections are used, the first step after the dispensing-, emptying- or cleaning procedure is to loosen the clamp or quick-tightening element on the dosage-dispensing element and to pull the latter off the outlet spout. Now the hose is tied off above the dosage-dispensing element. If an intermediate part with a sealing sleeve is used, the intermediate part is slid back on the outlet spout in the direction towards the storage container. If instead of the sealing sleeve a hose-shaped inflatable sealing profile is used on the intermediate part, the inflatable sealing profile is first deflated through the pneumatic valve which is arranged on the sealing profile and then slid back as described above. If the film hose is fixated on the outlet spout with a separate tightening- or clamping device, for example with a ring or band that includes a quick-tightening device or a tightening screw, then the latter will likewise have to be loosened. Next, the hose section protruding from the slot-shaped outlet opening of the dosage-dispensing element has to be tied off in order to prevent the further escape of free-flowing or pourable material still present in the hose. The dosage-dispensing element can now be pulled off the hose and the latter can now be completely removed from the outlet spout for disposal. If an endless film hose is used which is stored in the area of the outlet spout, the procedure is similar, but instead of completely pulling off the soiled hose section, only a sufficient length of film hose is advanced from the supply as is necessary to make an unsoiled hose section available again.

BRIEF DESCRIPTION OF THE DRAWINGS

Further advantages, features and distinguishing characteristics of the invention are presented in the following description of preferred embodiments of the invention, without thereby implying any limitation. The description makes reference to the schematic illustrations which are not drawn to scale and wherein.

DETAILED DESCRIPTION

Figure 1:
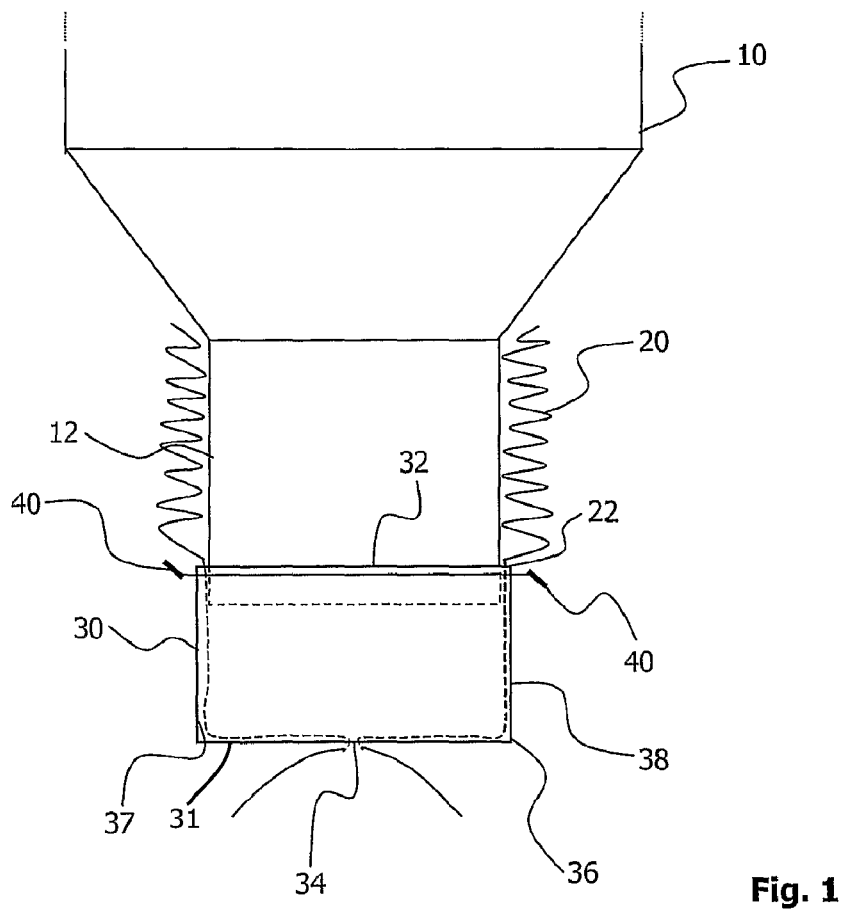
FIG. 1 represents a preferred embodiment of a dosage-dispensing element according to the invention on a storage hopper for pourable bulk materials.

In the embodiment of FIG. 1, the dosage-dispensing element 30 is fastened to a storage hopper 10 for pourable bulk materials. A film-shaped material 20 in the form of an endless hose is stored in the area of the outlet spout 12. The dosage-dispensing element 30 is held tight by means of clamps 40 in the lower part of the outlet spout 12. Prior to fastening the dosage-dispensing element 30, the film-shaped material 20 was threaded through the ring gap 22 into the dosage-dispensing element 30 and passed through the latter. The inside is thereby covered with the film-shaped material 20, as is the inlet opening 32. Due to the fact that the film-shaped material 20 is passed through the slot-shaped outlet opening 34 in end wall 31 to the outside of the dosage-dispensing element 30, the outlet opening 34 is likewise covered with the film-shaped material, so that the dosage-dispensing element 30 can never come into direct contact with the pourable material. The slot-shaped outlet opening continues to perform its function in spite of the film-shaped material passing through it and ensures the correct dispensing of the free-flowing or pourable bulk materials in the process as well as the correct shut-off of the product flow.

Figure 2:
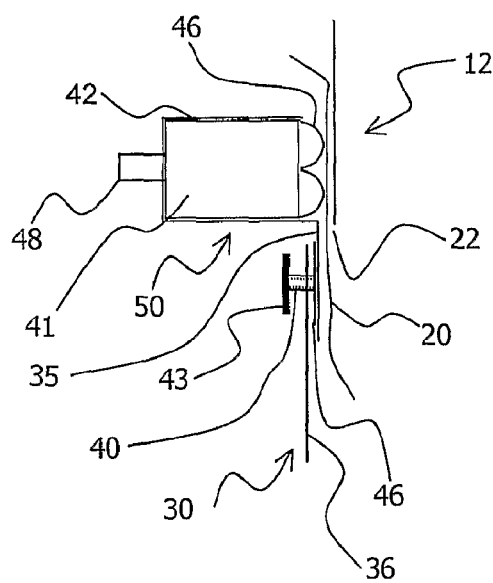
FIG. 2 represents an embodiment of a circular inflatable sealing profile on an intermediate part which is used to clamp the intermediate part to the outlet spout of a storage hopper, partially in sectional view.

FIG. 2 shows an embodiment of a sealing profile 41 on an intermediate part 50 which is arranged between the outlet spout 12 of the storage hopper 10 and the dosage-dispensing element 30. The sealing profile 41 is configured as a circular, hose-shaped sealing profile 41 with a clamping pad 46. The first purpose of the sealing profile 41 is to press the film-shaped material 20 against the outlet spout 12. As an additional consequence of this compression, a sealing effect occurs which seals the intermediate part 50 and the dosage element 30 which is attached to it. The sealing effect is due to the fact that with the hose-shaped profile of the sealing profile 41, the inflation level of the sealing profile 41 can be controlled through a pneumatic valve 48. The sealing profile 41 is received in a clamping profile 42 made of a U-shaped rail on which the intermediate part 50 is formed as a welded-on or folded-out extension. The clamping profile makes it possible to clamp the intermediate part 50 to the outlet spout 12. The design provides for a clamp 40 which serves to fasten the dosage-dispensing element 30 to the intermediate part 50. The clamp 40 includes a tightening screw 43 and a clamping pad 46. Several of these clamps 40 with clamping pads 46 are arranged in the area of the circumference of the intermediate part 50. By applying the tightening screws 43 the clamping pads 46 are moved in the direction towards the outside 35 of the intermediate part 50, so that they clamp the film-shaped material 20 and the dosage-dispensing element 30 onto the intermediate part 50. At the same time, the ring gap 22 is largely closed up.

Figure 3:
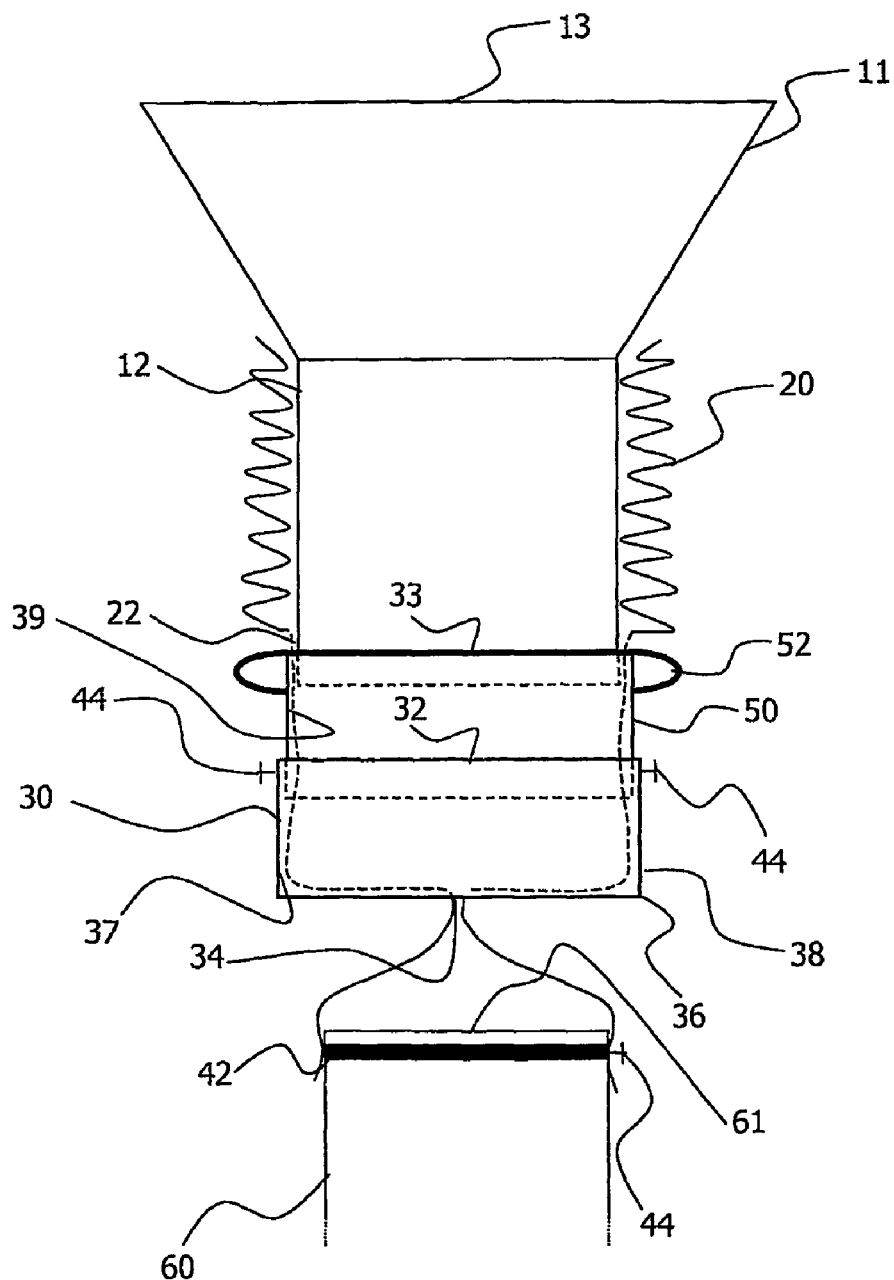
FIG. 3 represents a preferred embodiment of a dosage-dispensing element according to the invention on a funnel for pourable materials, with an intermediate part that is configured as a spout.

A further preferred embodiment of the dosage-dispensing element 30 according to the invention is illustrated in FIG. 3. Unlike the situation FIG. 1, the dosage-dispensing element 30 is not attached to a storage hopper 10 but closes off the outlet spout 12 of a funnel 11 which is used to fill different formulation components into a receptacle, for example in the chemical industry. In addition to the dosage-dispensing element 30, the illustrated funnel 11 includes an intermediate part 50 configured as a spout. At the end facing towards the funnel inlet 13, the intermediate part 50 has a sealing sleeve 52 whereby on the one hand the film-shaped material 20 which is stored as an endless hose in the area of the outlet spout 12 is held in place on the outlet spout 12, and on the other hand the intermediate part 50 can be clamped onto the outlet spout 12. The end of the intermediate part 50 that faces away from the funnel inlet 13 reaches into the dosage-dispensing element. The dosage-dispensing element 30 is releasably connected to the intermediate part 50 by means of quick-tightening devices 44. The film-shaped material 20 has been pulled through the ring gap 22 and through the intermediate part 50 into the dosage-dispensing element 30 and through the slot-shaped outlet opening 34 to the outside. It therefore covers the inlet opening 33 of the intermediate part 50, the walls 39 and 37 of the intermediate part 50 and of the dosage-dispensing element 30, as well as its slot-shaped outlet 34. In the illustrated example, the film-shaped material 20 protruding from the slot-shaped outlet 34 is attached to a container 60 that is to be filled. This attachment is secured by way of a ribbon-shaped clamping profile 42 which is held under tension by quick-tightening devices 44 in the area of the inlet opening 61 of the container 60.

After the filling process is completed, the funnel will be cleaned if necessary or prescribed. As a first step, the slot-shaped outlet 34 of the dosage-dispensing element 30 is closed. Then the film-shaped material 20 is tied off and separated below the dosage-dispensing element 30 or welded together. The container 60 is thereby closed at the same time and can be removed. Next, the slot-shaped outlet 34 is opened again to allow the cleaning agents to run out. After the cleaning process has been finished, the slot-shaped outlet 34 of the dosage-dispensing element 30 is closed and the end of the film-shaped material 20 that protrudes from the slot-shaped outlet 34 is tied off tightly. After releasing the quick-tightening devices 44, the dosage-dispensing element 30 is pulled off the intermediate part 50. As a safety precaution, the film-shaped material 20 can be tied off again below the intermediate part 50. The intermediate part 50 is now slid on the outlet spout 12 in the direction towards the funnel inlet 13, and at the same time the film-shaped material 20 is pulled in the opposite direction through the intermediate part 50 until a sufficient amount of unused film-shaped material 20 is available below the outlet spout 12. The soiled portion of the film-shaped material 20 is tied off, separated and disposed of. After lowering the intermediate part 50, fixating the dosage-dispensing element 30 and pulling the film-shaped material out through the slot-shaped outlet 34, a new dispensing process can be started. The dosage-dispensing element 30, like the intermediate piece 50, had no direct contact with the dosage material and therefore does not need to be cleaned and/or checked for contamination in a labor-intensive and costly process, but is almost immediately after use available again for subsequent dispensing processes.

Figure 4:
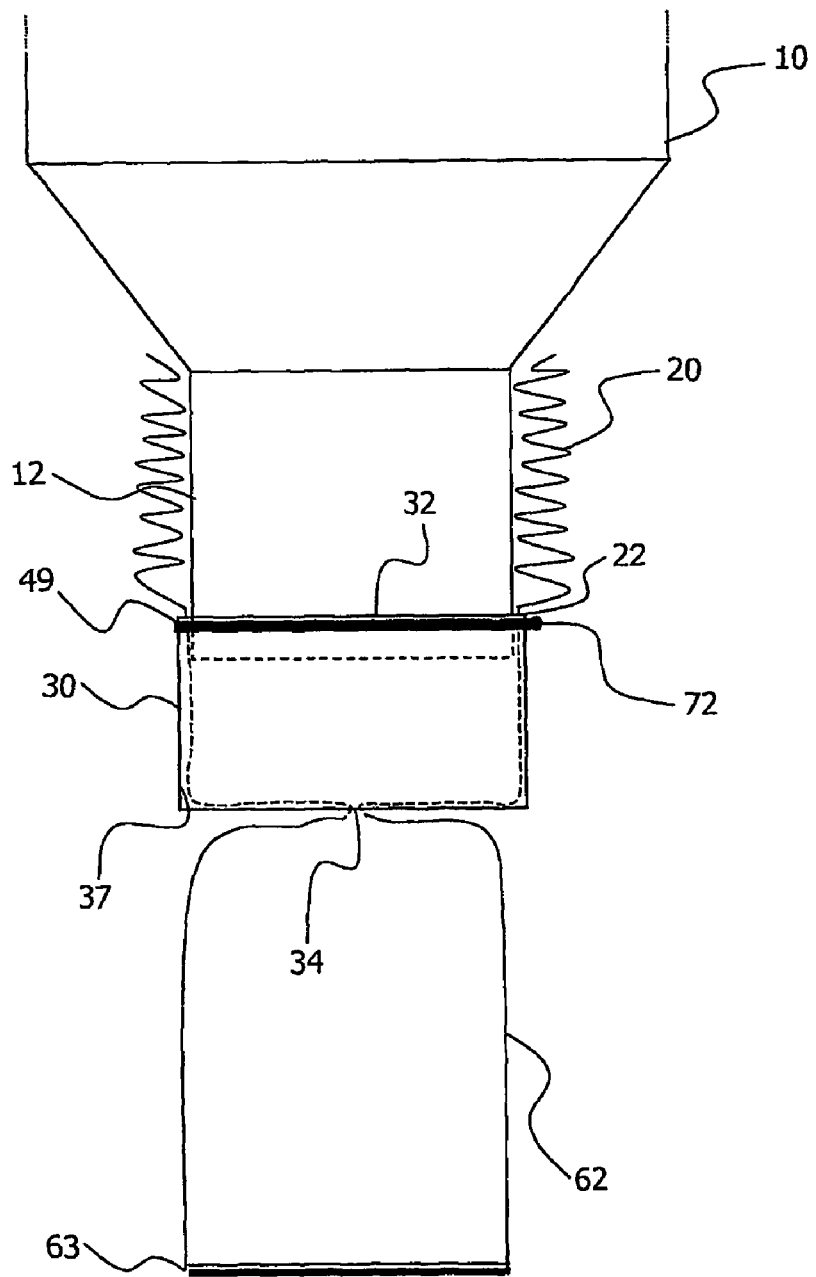
FIG. 4 represents a preferred embodiment of a dosage-dispensing element according to the invention on a storage hopper for pourable materials, wherein the film-shaped material is welded together into a bag.

The dosage-dispensing element 30 in FIG. 4 is used on a storage hopper 10 for pourable materials. A film-shaped material 20 is stored in the area of the outlet spout 12 as an endless hose. The dosage-dispensing element 30 is held tight on the bottom part of the outlet spout 12 by means of a band clamp 49. The tension of the band clamp 49 is produced by tightening the tensioning screw 72. The film-shaped material 20 was introduced through the ring gap 22 into the dosage-dispensing element 30 and passed through the latter. As a result, the inside 37, the inlet opening 32 and the slot-shaped outlet opening 34 are lined with the film-shaped material 20. The slot-shaped outlet opening 34 continues to perform its function in spite of the film-shaped material 20 that passes through it and ensures the correct dispensing of the pourable material as well as the cut-off of the product flow when necessary. The film-shaped material 20 in the embodiment of FIG. 4 additionally has a welded bottom seam 63. With the latter, a bag 62 is formed out of the film-shaped material 20 to form a receptacle for the material being dispensed. After the dispensing process has been completed, the film-shaped material 20 is welded together slightly below where it leaves the slot-shaped outlet opening 34, whereby on the one hand the filled bag 62 is closed and on the other hand the bottom seam 63 is produced for the next-following bag that is to be filled. In order to contaminate the environment as little as possible after the welding, the film-shaped material 20 can in addition be tied off below the dosage-dispensing element 30 after the dispensing process and prior to the welding. For less critical pourable materials, the bottom seam 63 can of course also be produced in other ways rather than by welding. If a suitable film-shaped material 20 is used, it is for example conceivable to sew the bottom seam 63 with a hand-held bag-sewing machine.

Figure 5A:
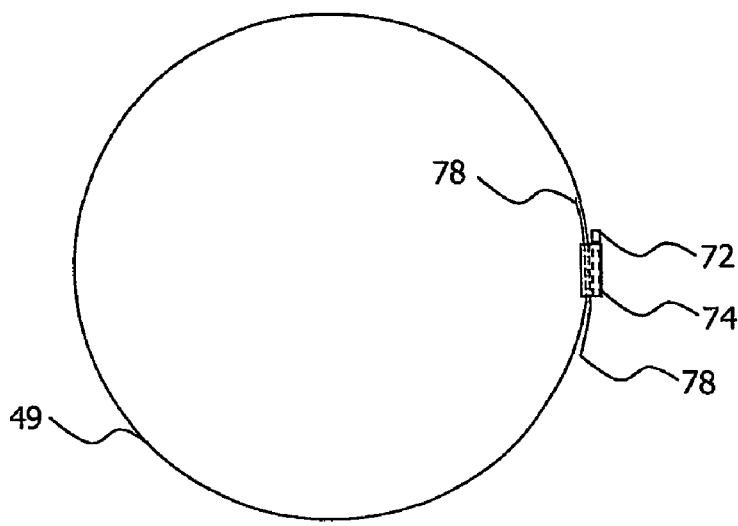
FIGS. 5a and 5b represent embodiments of the devices used for clamping, as seen from above.

FIG. 5*a* shows a clamping band 49 which can be used for all clamping tasks that occur within the scope of the present invention. The end portions 78 of the clamping band 49 overlap in the area of the band tensioner 74 and are pulled tight by means of the tensioning screw 72. The tightening occurs after one or more clamping bands 49 have been put in place at suitable locations on the dosage-dispensing element 30, the intermediate part 50, the container 60 and/or the outlet spout 12.

Figure 5B:
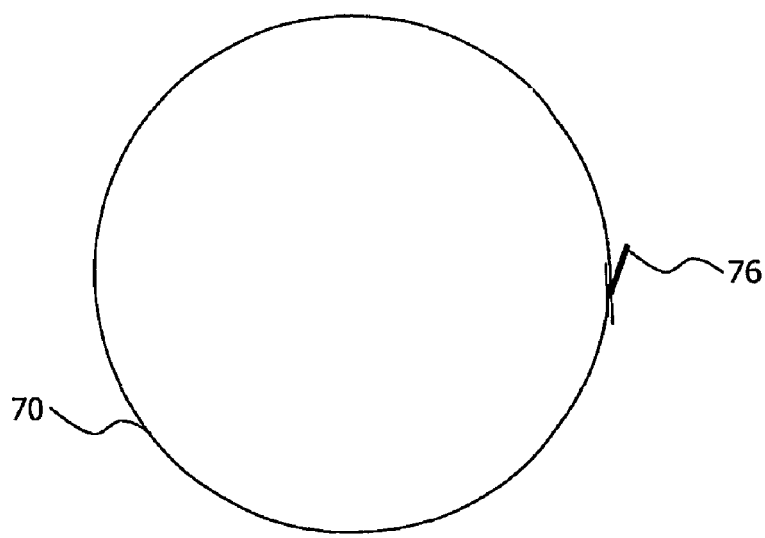

A further embodiment of a clamping means is shown in FIG. 5*b*, which shows a clamping band 70 which can likewise be used as a clamping means. The tightening occurs by applying the tensioning lever 76 after the clamping band 70 has been put in place at the desired location of the dosage-dispensing element 30, the intermediate part 50, the container 60 and/or the outlet spout 12. The resultant shortening of the clamping band 70 produces the clamping effect.

Figure 6:
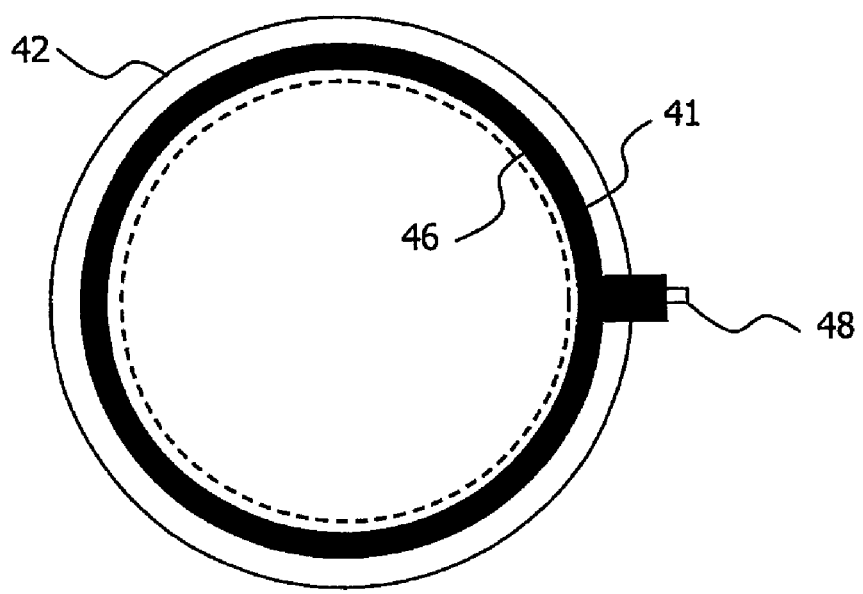
FIG. 6 represents an embodiment of an inflatable sealing profile, likewise in a view from above.

FIG. 6 shows a sealing profile 41 in plan view. The sealing profile 41 is configured as a ring-shaped hose with a clamping surface 46. The thickness of the sealing profile 41 can be controlled through inflation or deflation by way of a pneumatic valve 48. The most extended condition of the inflated sealing profile 41 is represented by a broken line in FIG. 6. Through the clamping surface 46 of the sealing profile 41, the film-shaped material 20 can thus be either pressed against the outlet spout 12 or released from the latter. In addition, the compression is accompanied by a sealing effect which during the filling process effectively prevents the escape of the material being dispensed. The sealing profile 41 is received in a clamping profile 42 made of a U-shaped rail, on which the intermediate part 50 is formed as an extension that is welded on or folded over.

What is claimed is:

1. A device, used on a container, for dispensing a free-flowing or pourable bulk material in dosages, the container having an outlet spout that extends into the device, the device comprising: a body, defined by a side wall that extends from an inlet opening at an end that faces towards the container to an end wall that faces away from the container, a slot-shaped outlet opening formed in the end wall, the side wall having an inner side and an outer side, the inlet opening adapted for receiving the outlet spout and being larger than the outlet spout such that an annular gap is defined between the inlet opening and the outlet spout; means for releasably connecting the body to the outlet spout between the inlet opening and the outlet opening, said means comprising a clamp and an additional intermediate part; and a film, arranged near the outlet spout, such that the film passes from outside the body beyond the inlet opening, through the body and again outside the body through the slot-shaped outlet, covering the inner side of the wall between the inlet opening and the slot-shaped outlet opening; wherein the slot-shaped outlet opening is sized to be large enough for the film to pass therethrough and small enough to prevent passage of the outlet spout therethrough.

2. The device of claim 1, wherein:
the film is a hose liner.

3. The device of claim 1, wherein:
the film is a hose section.

4. The device of claim 1, wherein:
the film is stored in the form of an endless ribbon.

5. The device of claim 4, further comprising:
a device for producing a weld seam running lengthwise in the film, the device located in the area of the inlet opening.

6. The device of claim 4, wherein the intermediate part is arranged between the outlet spout and the inlet opening.

7. The device of claim 1, wherein the intermediate part provides a means for releasably connecting the film to the outlet spout.

8. The device of claim 1, further comprising:
a film-separating device positioned near at least one of the openings.

9. A method for cleanly dispensing, from a container having an outlet spout, a free-flowing or pourable bulk material in dosages, comprising the steps of:
providing a device according to claim 1, with a first portion of the film deployed out of the device through inlet opening and with a second portion of the film deployed through the slot-shaped outlet to the outside of the device;
installing the device onto the container such that the first portion of the film passes through the annular gap between the inlet opening and the outlet spout; and
dispensing a dosage of the bulk material into a receiving container through the body of the installed device, the film preventing contact of the body with the material being dispensed.

10. The method of claim 9, wherein:
the installing step further comprises connecting the film to the outlet spout by clamping.

11. The method of claim 9, wherein:
a film in the form of a ribbon, after having been introduced through the annular gap and prior to being passed through the device, is welded together into a hose.

12. The method of claim 9, wherein: the providing step further comprises the step of providing the additional intermediate part; and the installing step further comprises the step of setting the additional intermediate part into a sealing relationship between the outlet spout and the device.

13. The method of claim 9, further comprising the step of:
de-installing the device from the container after the dispensing step is performed more than one time.

* * * * *